United States Patent
Haunhorst et al.

(10) Patent No.: US 6,880,598 B2
(45) Date of Patent: Apr. 19, 2005

(54) CHECK VALVE FOR TIRE INFLATION SYSTEM

(75) Inventors: Gregory A. Haunhorst, Perrysburg, OH (US); Todd J. Vogel, Waterville, OH (US); Charles J. Martin, Ann Arbor, MI (US); Chris L. Schwab, Maumee, OH (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/236,803

(22) Filed: Sep. 6, 2002

(65) Prior Publication Data
US 2004/0045651 A1 Mar. 11, 2004

(51) Int. Cl.[7] .............................................. B60C 23/10
(52) U.S. Cl. .......................... 152/415; 152/416; 137/223
(58) Field of Search ................................ 152/415, 416, 152/417; 137/223, 231

(56) References Cited

U.S. PATENT DOCUMENTS

| | | | | |
|---|---|---|---|---|
| 2,255,932 A | * | 9/1941 | Kraft et al. .................. | 152/430 |
| 4,077,456 A | * | 3/1978 | Smith .......................... | 152/427 |
| 4,246,930 A | * | 1/1981 | Bishop et al. ............ | 137/493.9 |
| 4,765,358 A | * | 8/1988 | Cady ........................... | 137/223 |
| 4,991,618 A | * | 2/1991 | Gould ......................... | 137/225 |
| 5,094,263 A | * | 3/1992 | Hurrell et al. .............. | 137/224 |
| 5,261,471 A | * | 11/1993 | Freigang et al. ............. | 152/415 |

* cited by examiner

Primary Examiner—Russell D. Stormer
(74) Attorney, Agent, or Firm—Honigman Miller Schwartz and Cohn LLP

(57) ABSTRACT

A wheel valve assembly for adjusting the air pressure within a pneumatic tire is provided that includes a body that extends from a first end in communication with a pressure source to a second end in communication with the tire. A low pressure differential operable valve member is received within the body. The valve member is moveable between open and closed positions for respectively allowing and preventing air communication between the internal segment and the external segment of the body. The check valve of the present invention is virtually unaffected by the centrifugal force of a rotating tire to substantially prevent back flow of the tire air when the tire is rotating at a relatively high speed.

14 Claims, 9 Drawing Sheets

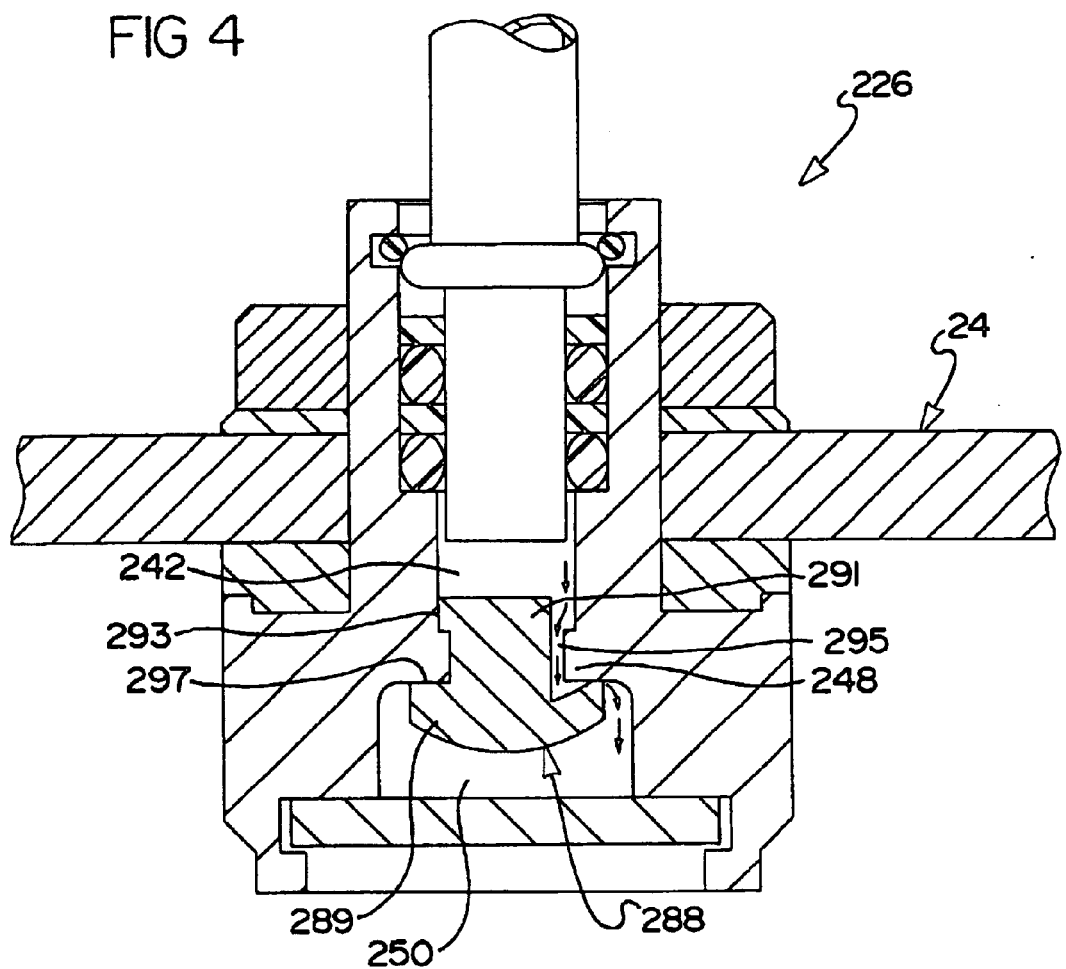

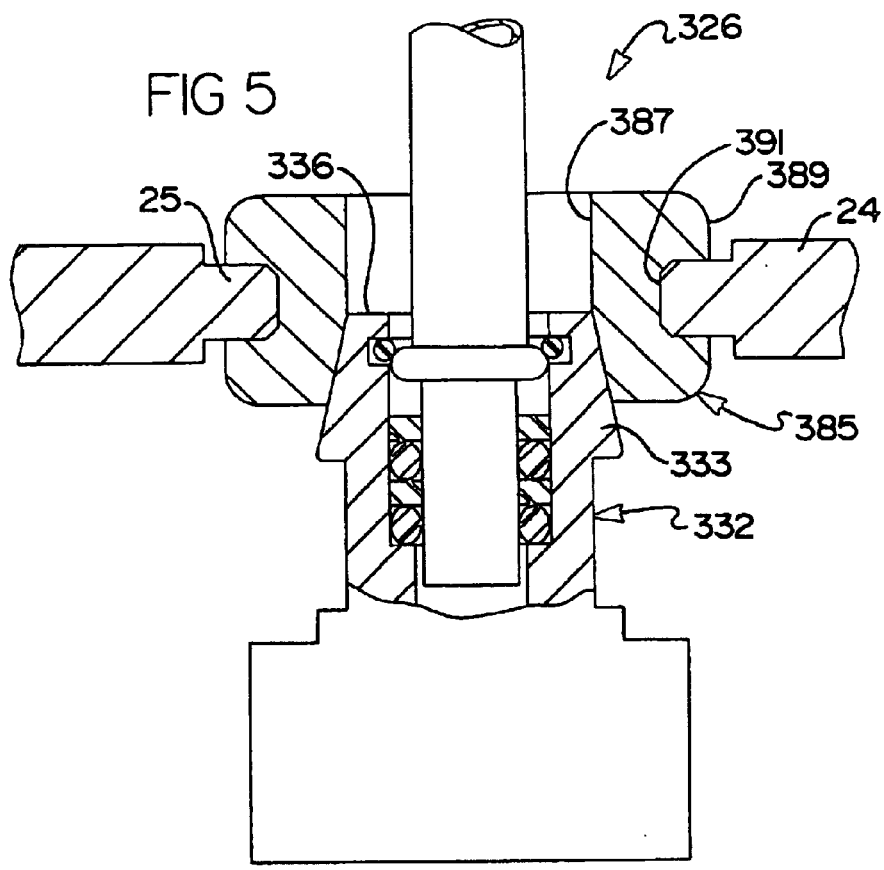

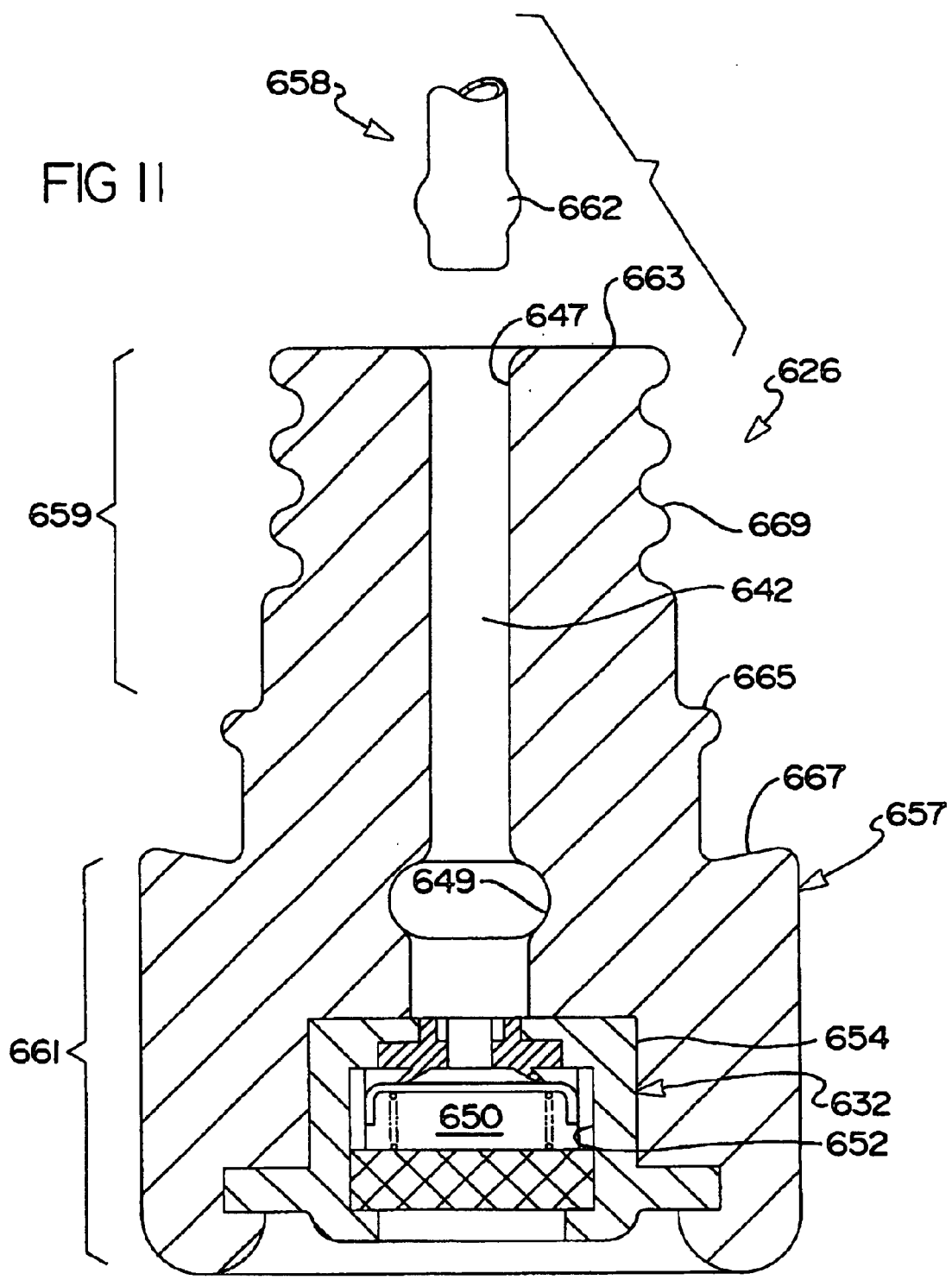

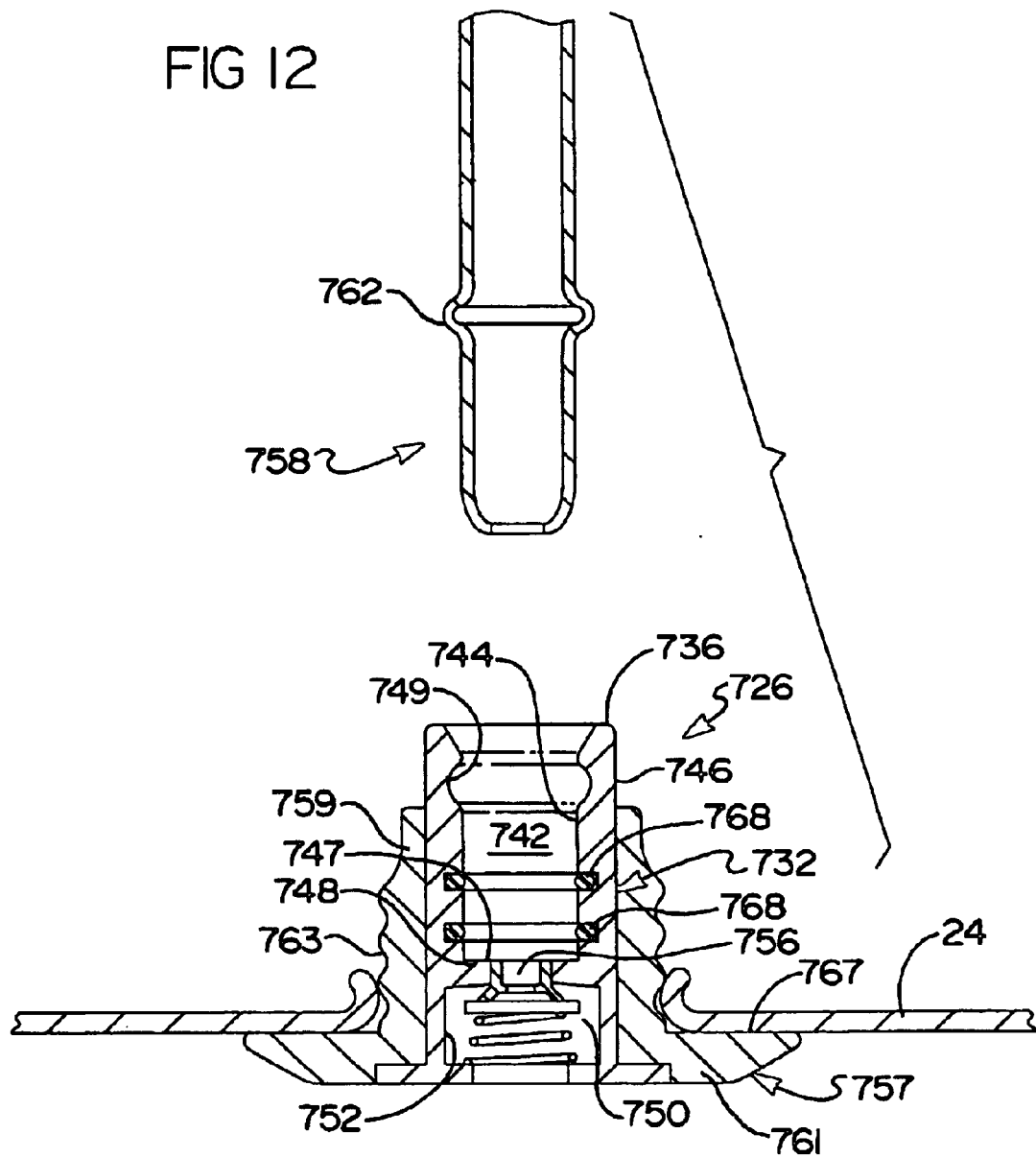

CHECK VALVE FOR TIRE INFLATION SYSTEM

FIELD OF THE INVENTION

The present invention relates to vehicle tire inflation systems and more particularly to a rim mounted check valve for use in a vehicle tire inflation system.

BACKGROUND OF THE INVENTION

One limitation associated with pneumatic tires is the need to maintain proper tire air pressure during vehicle operation. A relatively low or high pressure tire can often go undetected for a long period of time, which poses a serious risk of tire failure. While it is prudent to periodically check tire inflation pressure with an air pressure gauge, such checks are generally not conducted.

The concept of providing an on-axle tire inflation system, or what is known as a central tire inflation system (CTIS) or automatic tire inflation system (ATIS), is well known in the art. Such systems remotely or automatically inflate a pneumatic tire rotatably mounted onto the axle of a vehicle via an air distribution system. Typically, an on-board source of pressurized air, such as compressed air from a vehicle air compressor or a hub mounted pump, is used to fill the tire and/or maintain proper tire pressure.

To connect the air source to the vehicle wheel, a check valve is typically disposed through the rim of the wheel. The check valve allows air to flow from the air source into the tire, but inhibits air flow from the tire back to the air source. In a typical check valve application unrelated to the subject environment, a relatively large pressure differential on each side of a valve member assists the valve spring in forcing the valve member against the sealing member to close the check valve. However, in a tire inflation system, the pump pressure on one side of valve member is substantially similar to the tire pressure on the other side of valve member, creating a relatively low pressure differential. Additionally, because the check valve is mounted in the wheel rim and is subjected to centrifugal force of the rotating tire, conventional check valve designs will generally allow back flow of the tire air into the air source when the wheel is rotating at a relatively high speed.

SUMMARY OF THE INVENTION

A valve assembly is provided that is particularly suited for, but not limited to, adjusting the air pressure within a pneumatic tire. The valve assembly includes a body that extends from a first end in communication with a pressure source to a second end in communication with the tire. A low pressure differential operable valve member is received within the body. The valve member is moveable between open and closed positions for respectively allowing and preventing air communication between the pressure source and the tire.

Among other things, the ability of the valve member to seal in the presence of a low pressure differential between the pressure source and the tire inhibits back flow of the tire air into the pressure source. Additionally, the valve member of the present invention is virtually unaffected by centrifugal force of a rotating tire. This feature substantially prevents back flow of the tire air when the tire is rotating at a relatively high speed.

Various additional aspects of this invention will become apparent to those skilled in the art from the following detailed description of the preferred embodiments, when read in light of the accompanying drawings.

BRIEF DESCRIPTION OF THE DRAWINGS

FIG. 4 is a partial cross-sectional view of a check valve according to another embodiment of the present invention.

FIG. 5 is a partial cross-sectional view of a check valve according to another embodiment of the present invention, shown prior to assembly onto a vehicle wheel rim.

FIG. 6 is a partial cross-sectional view of the check valve of FIG. 5 after assembly onto the vehicle wheel rim.

FIG. 11 is a partial cross-sectional view of a check valve according to another embodiment of the present invention.

FIG. 12 is a cross-sectional view of a check valve according to another embodiment of the present invention.

DESCRIPTION OF THE PREFERRED EMBODIMENTS

Figure 1:
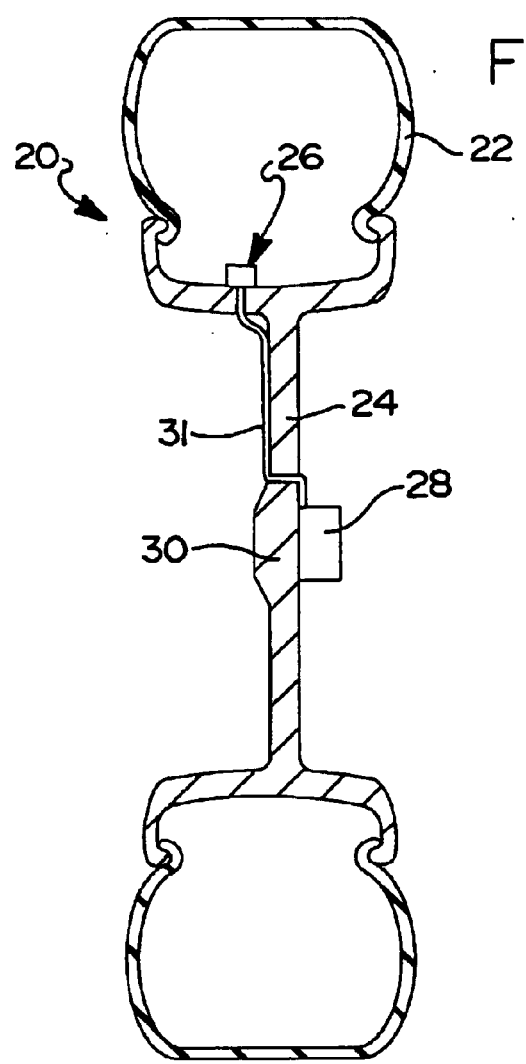
FIG. 1 is a simplified illustration of a typical motor vehicle wheel assembly that includes of a pneumatic tire, a rim and a check valve according to the present invention.

Referring to FIG. 1, there is illustrated a typical wheel assembly 20 of a motor vehicle, not shown, which includes a pneumatic tire 22, a rim 24 and a check valve 26 according to the present invention. In the exemplary vehicle assembly, a tire pressurizing and regulating apparatus 28 is axially mounted on a vehicle hub 30 for axial rotation therewith. Apparatus 28 is connected to check valve 26 via a conduit 31 to introduce pressurized air into pneumatic tire 22.

Figure 2:
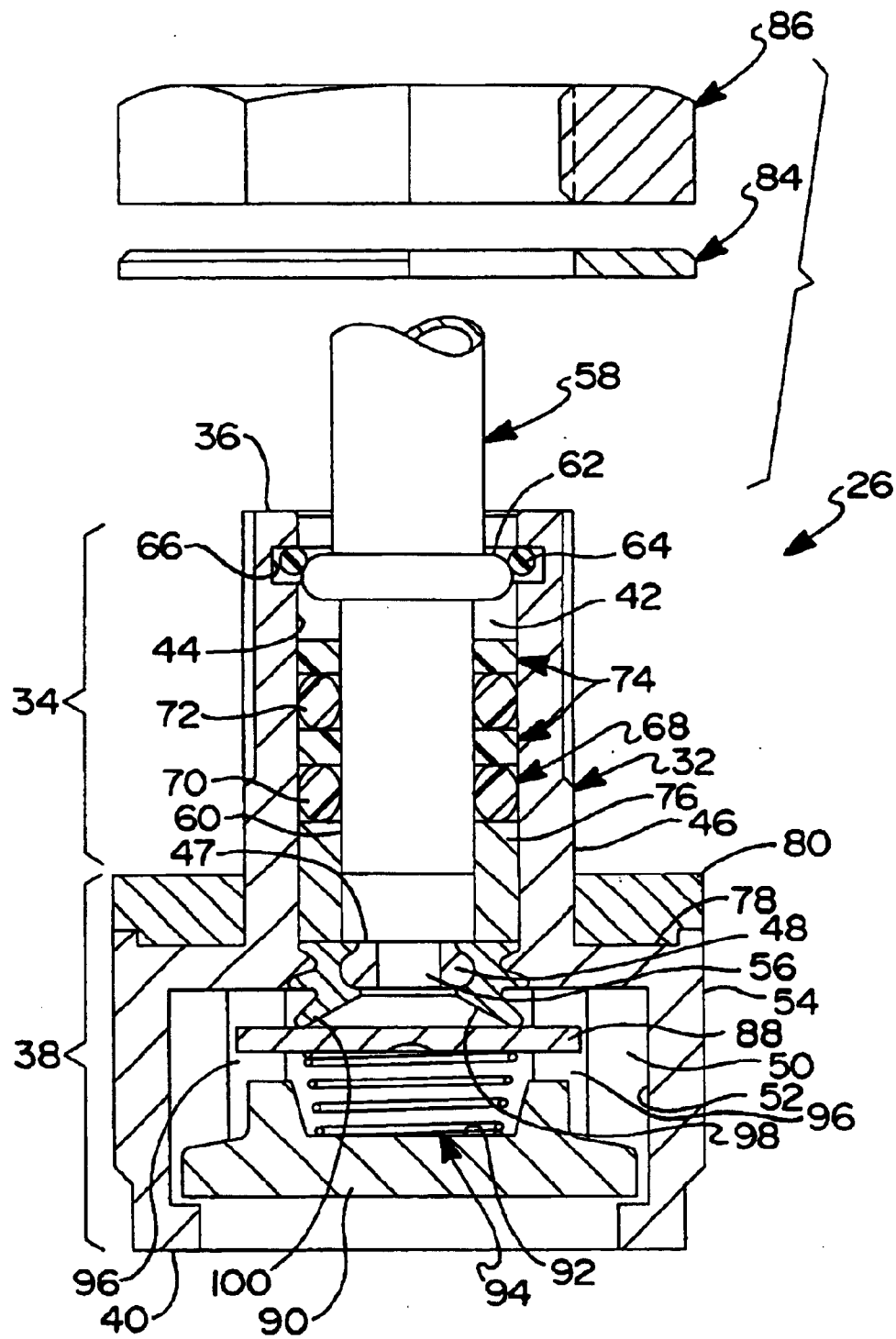
FIG. 2 is a partial cross-sectional view of a check valve according to an embodiment of the present invention, shown prior to assembly onto a wheel rim.
Figure 3:
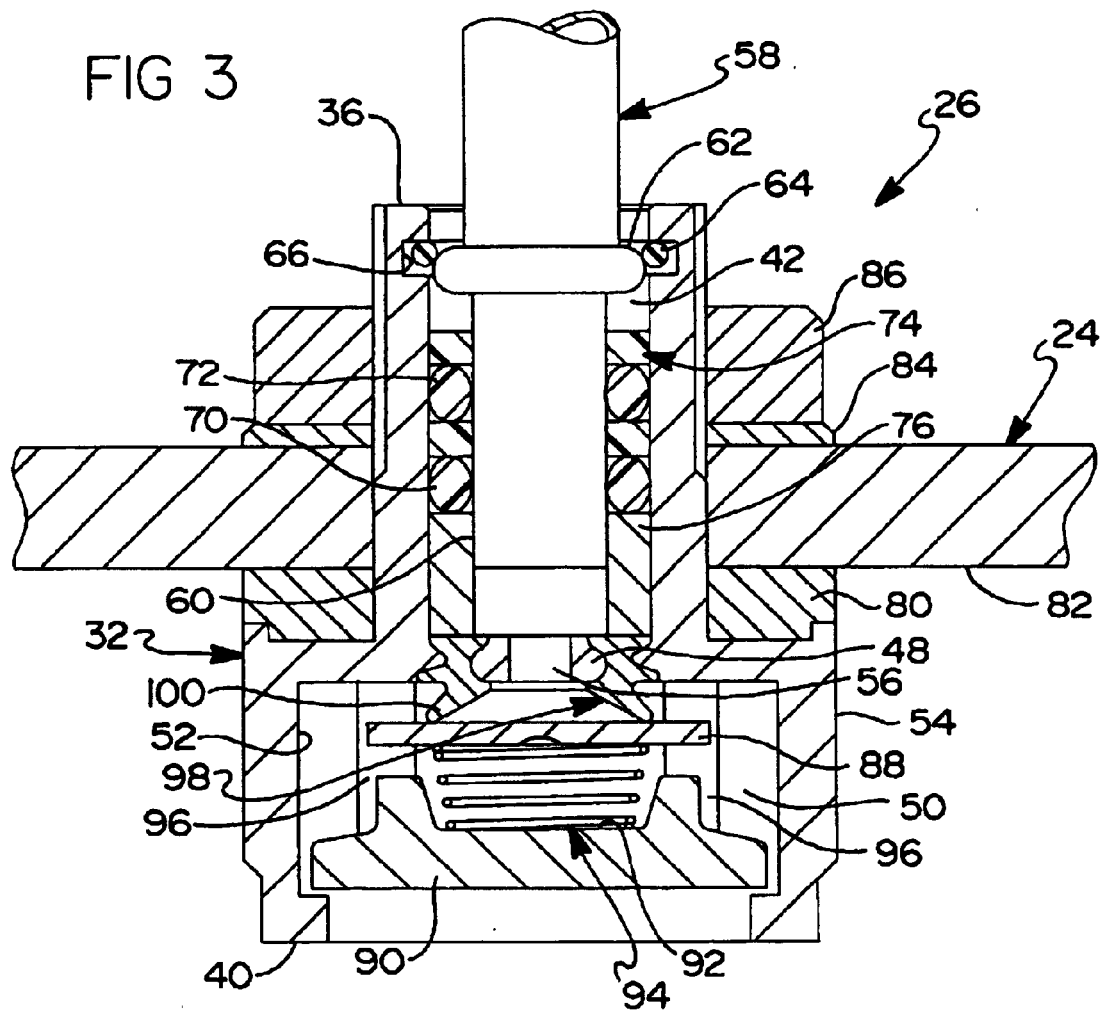
FIG. 3 is a partial cross-sectional view of the check valve of FIG. 2 after assembly onto the wheel rim.

Referring now to FIGS. 2 and 3, an embodiment of check valve 26 is described in detail. Check valve 26 includes a generally cylindrical body 32 made from a rigid material, such as metal or plastic. Body 32 includes an external segment 34 having an external end 36 and an internal segment 38 having an internal end 40. The term "internal" refers to the portion of check valve 26 residing within or directly communicating with the cavity formed between rim 24 and tire 22. External segment 40 includes a central longitudinal channel 42 and inner and outer surfaces 44 and 46, respectively. Central longitudinal channel 42 extends from external end 36 of body 32 to an inner surface 47 defined by a radially inwardly directed shoulder 48. Internal segment 38 includes an internal opening 50 in addition to inner and outer surfaces 52 and 54, respectively. Central longitudinal channel 42 is provided in communication with internal opening 50 via a duct 56.

A distal end of conduit 31 is provided with a tubular male connector 58 that is received within central longitudinal channel 42 to connect apparatus 28 to check valve 26. In the embodiment illustrated in FIGS. 2 and 3, male connector 58 includes a smooth sealing surface 60 and a rib 62 that is engaged by a resiliently expandable retaining member 64, such as a garter spring or split locking ring, to secure male connector 58 within channel 42. Retaining member 64 resides within a radially outwardly directed groove 66 having an internal diameter sized to allow retaining member 64 to expand over rib 62 during connection and disconnection of male connector 58 from check valve 26. The resilient properties of retaining member 64 provide both a tactile indication of connection and inhibit removal of male connector 58 up to a predetermined load. Because the tire inflation pressure is relatively low, the retention load is just large enough to hold the components together under pressure, yet weak enough to permit disconnection by manually pulling the components apart.

Within central longitudinal channel 42 is also disposed at least one sealing member 68, such as an o-ring. Because check valve 26 may be required to operate in an automotive "under-hood" environment, check valve 26 may include at least two sealing members 68 to provide redundant sealing and a broader range of temperature and fluid compatibility. For example, in the embodiment illustrated in FIGS. 2 and 3, a first or innermost sealing member 70 is made from a polymeric material, such as silicone rubber, having the ability to remain flexible at relatively low temperatures. A second or outermost sealing member 72 is made from a polymeric material, such as hydrogenated acrylonitrile-butadiene rubber (HNBR), having a relatively high resistance to automotive under-hood fluids, such as motor oil. Optionally, each sealing member 70, 72 may be supported axially by a support ring 74. Support rings 74 are positioned upstream of sealing members 70, 72 to guide male connector 58 into channel 42 and prevent damage to sealing members 70, 72 during entry. Support rings 74 also center male connector 58 within channel 42 (even if side-loaded) and are larger than retaining member 64 to prevent sealing members 70, 72 from pulling out of channel 42. A cylindrical spacer 76 may also be disposed between shoulder 48 and first sealing member 70 to align sealing members 70, 72 with sealing surface 60 on male connector 58.

The various embodiments of check valve 26 described herein are configured with quick connect/disconnect features which allow male connector 58 to be easily assembled to and disassembled from check valve 26. However, it will be appreciated that other means of connecting male connector 58 to check valve 26 may also be used, such as a threaded connection.

To secure check valve 26 within the rim wall of wheel assembly 20, outer surface 46 of body 32 is provided with external threads. Additionally, internal segment 38 is generally greater in diameter than external segment 34 to provide a shoulder 78 to support a sealing member 80, such as a grommet. Referring to FIG. 3, during assembly of check valve 26 onto rim 24, grommet 80 abuts an inner surface 82 of rim 24 while external segment 34 protrudes through a port in rim 24. A washer 84 and/or nut 86 is slid over external segment 34 and the internal threads of nut 86 engage the external threads of external segment 34 to secure check valve 26 to rim 24. It will be appreciated that the means of securing check valve 26 to rim 24 is not limited to that shown in FIG. 3, and that other means may be employed to secure check valve 26 to rim 24, some of which will be described in detail below.

Received within opening 50 of internal segment 38 is a valve device that includes a resiliently biased valve member 88 and a fluid permeable seat 90. In the embodiment shown in FIGS. 2 and 3, seat 90 includes a generally recessed inner surface 92 that positions a resiliently compressible member 94, such as a compression spring, under valve member 88. Seat 90 is made of a porous material, such as a sintered plastic, which allows air to pass into the tire and acts as a filter to prevent debris within the tire cavity from entering check valve 26. Internal end 40 is formed over a portion of seat 90 to retain seat 90, compressible member 94 and valve member 88 within opening 50. However, the components may be retained within opening 50 in any suitable manner, including, but not limited to, threading or press-fitting seat 90 within opening 50.

In the embodiment illustrated in FIGS. 2 and 3, valve member 88 is a generally cylindrical disk that is centered within opening 50 by at least three axially extending projections 96 that project radially inward from inner wall 52 of opening 50. Projections 96 define at least three channels therebetween that provide a flow path for the fluid to flow around valve member 88. To minimize the effects of centrifugal force, valve member 88 is made from a rigid material, such as plastic, having relatively little mass. In a first or closed position, valve member 88 is biased by compressible member 94 into engagement with a flexible "lip" seal 98 that is attached to body 32. Seal 98 is made of a polymeric material, such as silicone rubber, having properties that allow it to remain flexible at relatively low temperatures. When seal 98 is molded to body 32, shoulder 48 may include holes (not shown) through which the seal material may flow during manufacture. Alternatively, seal 98 may be adhered directly to the surface of shoulder 48 that faces opening 50.

During operation of apparatus 28, the pressure on the upstream or male connector side of valve member 88 is substantially similar to the downstream or tire side of valve member 88. The biasing force of compressible member 94 and the pressure differential hold valve member 88 closed while centrifugal force created by the rotating tire tends to pull valve member 88 open. Because there is pressure on both sides of valve member 88, the pressure differential between the upstream and downstream sides of valve member 88 is low, and the biasing force of compressible member 94 must be sufficiently small to achieve the low cracking pressure.

To overcome this relatively low pressure differential, seal 98 includes a thin outer lip 100 that easily conforms to the shape of valve member 88 during engagement. Lip 100 is pressure energized, i.e., forced to engage valve member 88 by the tire pressure present in opening 50, to enhance the seal at the valve member/seal interface. Thus, a sufficient seal can be obtained between seal 98 and valve member 88 with only a minimal biasing force against valve member 88. Valve member 88 is generally capable of sealing in the presence of a pressure differential less than approximately 1 psi (0.069 bar) and, more particularly, in the presence of a pressure differential on the order of approximately 0.15 psi (0.010 bar).

The features of the present invention also allow valve member 88 to open at a relatively low cracking pressure, i.e., the pressure need to unseat valve member 88 from seal 98. The cracking pressure required to unseat valve member 88 is generally less than approximately 5 psi (0.345 bar) and preferably around 3 psi (0.207 bar) plus or minus 1 psi (0.069 bar).

When the pressure differential on each side of valve member 88 is negligible, valve member 88 will remain in a first or closed position, shown in FIG. 2, sealingly engaged with seal 98. When the pressure on the upstream side of valve member 88 becomes sufficiently greater than the downstream pressure so as to overcome the biasing force of compressible member 94, valve member 88 is moved to a second or open position (not shown) that opens a flow path between male connector 58 and internal opening 50. The cracking pressure can be tailored to a particular application, for example, by selecting a compressible member 94 that produces the desired biasing force or altering the material properties or shape of seal 98.

Referring to FIG. 4, another embodiment of the present invention is shown. In this embodiment, a check valve 226 is provided that is substantially similar to check valve 26 with at least one exception, namely, the configuration of the valve device. Instead of a resiliently biased disk that engages a flexible lip seal to close the flow path, a valve member 288 is provided that functions as a self-actuating umbrella-type valve. In the embodiment shown in FIG. 4, valve member 288 is made from a flexible material, such a silicone rubber, and includes a generally rounded skirt 289 and a stem 291 extending axially away from skirt 289 in the upstream direction. Stem 291 includes a radial flange 293 that engages shoulder 248 to fix valve member 288 within check valve 226. At least one duct 295 extends through stem 291 into a portion of skirt 289. Duct 295 forms a flow path that provides central longitudinal channel 242 in communication with opening 250 when the fluid pressure in central longitudinal channel 242 exceeds the predetermined cracking pressure.

The opening or cracking pressure of valve member 288 can vary with material properties and shape of valve member 288. For example, pressure drop across valve member 288 can be controlled by the modulus of the material, effective flow area through duct 295, the amount of pre-load on the sealing edge of valve skirt 289 and the thickness of valve skirt 289. When valve member 288 is closed, skirt 289 forms a full 360° seal against an inner surface or seat 297 of opening 250. Like valve member 88 described above, valve member 288 has relatively little mass and is therefore generally unaffected by centrifugal force generated in a rotating wheel. Accordingly, skirt 289 will not become unseated from seat 297 due to centrifugal force alone. It will be appreciated that the cross-sectional design of valve member 288 is not limited to the profile illustrated in FIG. 4, and that other designs capable of sealing in the presence of a relatively low pressure differential are within the scope of this invention.

Referring to FIGS. 5 and 6, another embodiment of the present invention is shown. In this embodiment, a check valve 326 is provided that is substantially similar to check valve 26 with at least one exception, namely, the manner in which check valve 326 is attached to rim 24. As illustrated in FIG. 5, check valve 326 includes a generally cylindrical body 332 and a flexible polymeric sealing member or grommet 385. Grommet 385, which is received within a port in rim 24, includes inner and outer walls 387 and 389, respectively. Outer wall 389 includes a groove 391 sized to receive an inner lip 25 of rim 24. The flexibility of grommet 385 allows it to sealingly engage rim 24 when secured thereto.

Body 332 of check valve 326 includes a flared barb 333 that tapers outwardly away from external end 336. Flared barb 333 facilitates insertion of body 332 into grommet 385 during assembly. The flexibility of grommet 385 allows barb 333 to compress inner wall 387 as body 332 is inserted into grommet 385. Referring to FIG. 6, upon complete insertion of body 332 into grommet 385, inner wall 387 expands to sealingly engage outer surface 346 of body 332. Barb 333 and outer surface 346 define a pair of opposing shoulders 335 between which grommet 385 is held to inhibit removal of body 332 from grommet 385. Operation of check valve 326 is substantially similar to that described above with respect to check valve 26 or 226, and will not be described in further detail herein.

Figure 7A:
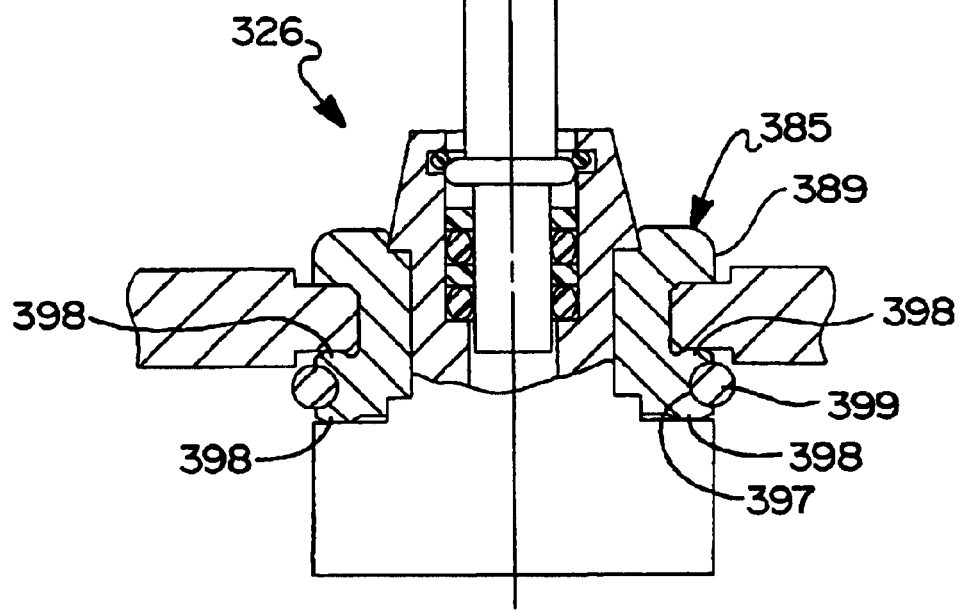
FIGS. 7A and 7B are partial cross-sectional views of an alternate embodiment of the check valve of FIGS. 5 and 6.
Figure 7B:
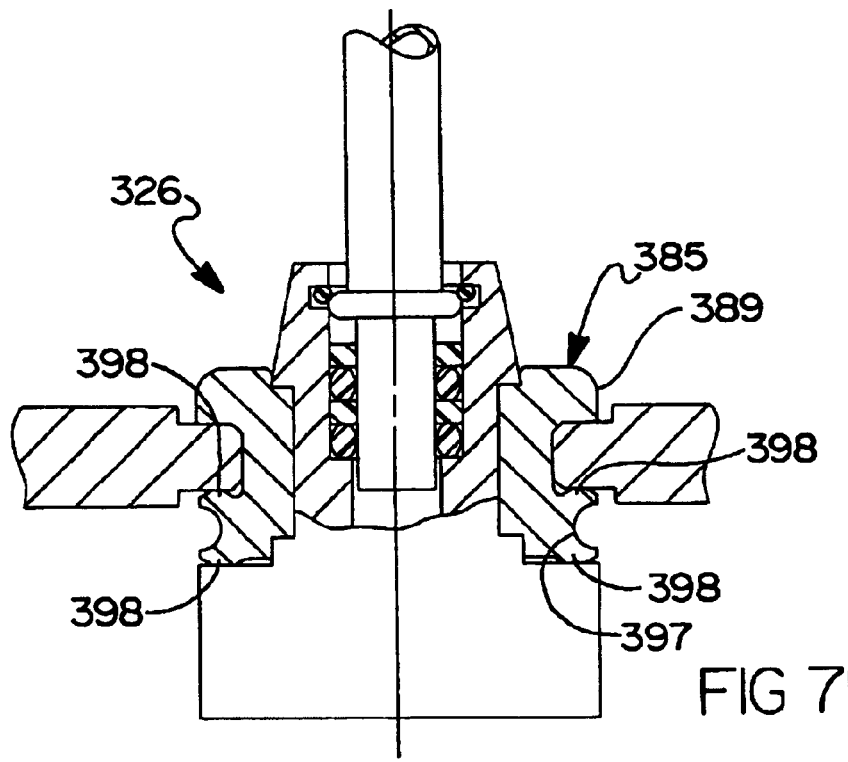

Referring to FIGS. 7A and 7B, alternate embodiments of check valve 326 are shown. In these embodiments, the portion of outer surface 389 of grommet 385 that is positioned on the tire side of rim 24 is provided with at least one seal enhancing feature. In the embodiment illustrated in FIG. 7A, this seal enhancing feature includes a radially inwardly directed groove 397 that defines a pair of sealing lips 398. Groove 397 contains a pressure energized annular member 399, such as an o-spring or o-ring. The air pressure within the tire exerts a force on annular member 399 causing it to compress and force sealing lips 398 against rim 24 and body 332 to increase squeeze and improve sealing engagement therebetween. In the embodiment illustrated in FIG. 7B, the tire pressure is applied directly to groove 397. The air pressure within the tire energizes sealing lips 398 to force the adjacent portions of grommet 385 against rim 24 and body 232 to increase squeeze and improve sealing engagement therebetween.

Figure 8:
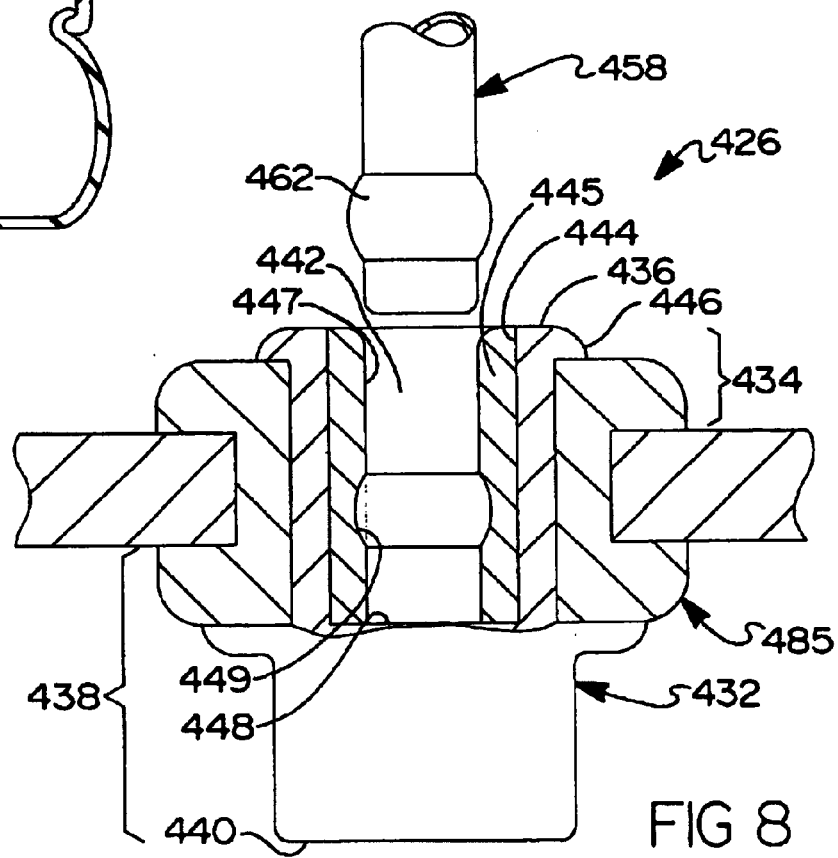
FIG. 8 is a partial cross-sectional view of a check valve according to another embodiment of the present invention.

Referring to FIG. 8, another embodiment of the present invention is shown. In this embodiment, a check valve 426 is provided that includes a generally cylindrically-shaped body 432 that is made from a rigid material, such as metal or plastic. Body 432 includes an external segment 434 having an external end 436 and an internal segment 438 having an internal end 440. Internal segment 438 includes a valve member (not shown), such as valve member 88 or valve member 288 described above. Check valve 426 may be secured to rim 24 using any suitable means, including a threaded nut, as shown in FIGS. 1 and 2, or pressed into a flexible grommet 485, as described above and shown in FIG. 8.

External segment 434 of body 432 includes a central longitudinal channel 442 and inner and outer surfaces 444 and 446, respectively. Central longitudinal channel 442 extends from external end 436 to a radially inwardly directed shoulder 448. Inner surface 444 is lined with a polymeric sealing layer 445, such as flourosilicone or EPDM rubber, having properties that allow it to remain generally flexible at relatively low temperatures. An inner surface 447 of sealing layer 445 is relatively smooth except for a recess 449, which accommodates a rib 462 on male connector 458. During assembly of male connector 458 into check valve 426, rib 462 is pressed into sealing layer 445 until it is aligned with recess 449. The inner diameter of sealing layer 445 is slightly smaller than the outer diameter of male connector 458 to provide for sealing engagement upon assembly. The force required to insert and remove male connector 458 into and out of check valve 426 is a function of the degree of interference between rib 462 and inner surface 447 and the compressibility of sealing layer 445, all of which can be tailored to the application.

Figure 9:
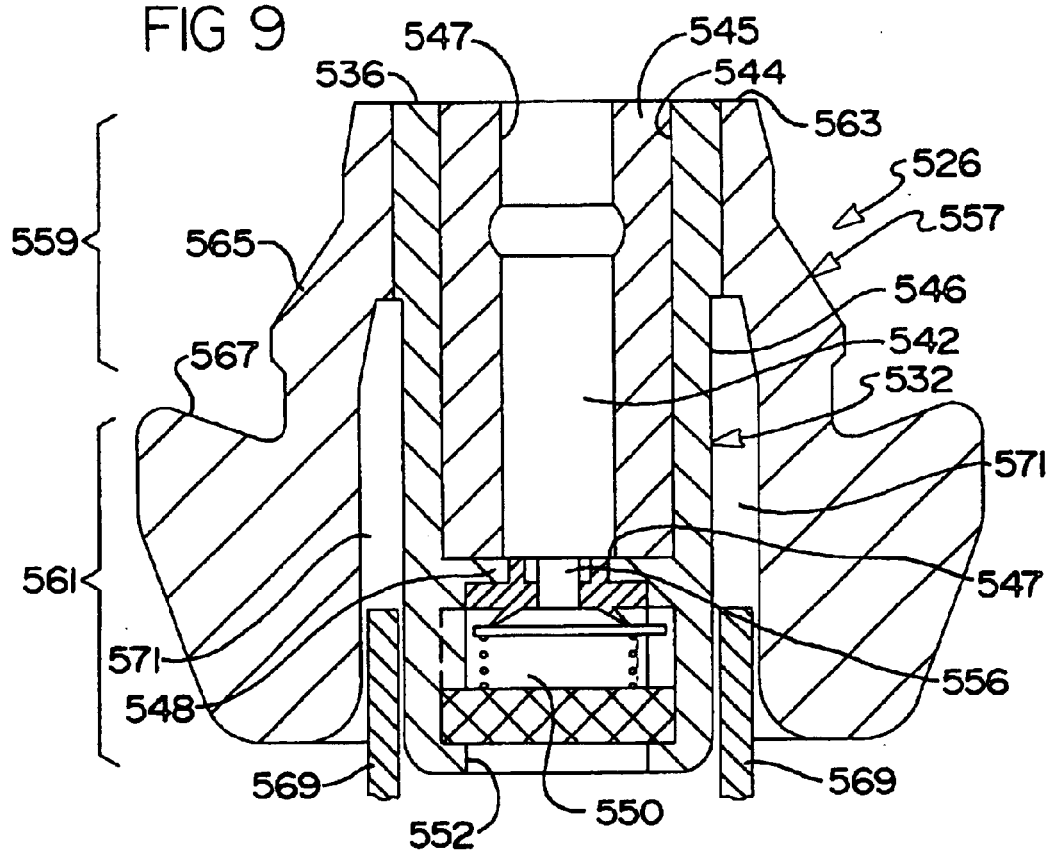
FIG. 9 is a cross-sectional view of a check valve according to another embodiment of the present invention.

Referring to FIG. 9, another embodiment of the present invention is shown. In this embodiment, a check valve 526 is provided that includes a generally cylindrically-shaped body 532 that is made from a rigid material, such as metal or plastic. Body 532 includes a central longitudinal channel 542 and inner and outer surfaces 544 and 546, respectively. Central longitudinal channel 542 extends from an external end 536 of body 532 to a surface 547 defined by a radially inwardly directed shoulder 548. Body 532 also includes an internal opening 550 having an inner surface 552. Central longitudinal channel 542 is provided in communication with internal opening 550 via a duct 556. Internal opening 550 includes a valve member, such as valve member 88 shown in FIGS. 2 and 9, or valve member 288 shown in FIG. 4.

Inner surface 544 of body 532 is lined with a polymeric sealing layer 545, such as flourosilicone or EPDM rubber, having properties that allow it to remain generally flexible at relatively low temperatures. An inner surface 547 of sealing layer 545 is relatively smooth except for a small portion of which is slightly recessed to accommodate a rib on male connector (none illustrated). The inner diameter of sealing layer 545 is slightly smaller than the outer diameter of the male connector to provide for sealing engagement upon assembly.

Check valve 526 also includes a sealing jacket 557 attached to body 532. Sealing jacket 557, which is made from a flexible polymeric material, such as flourosilicone or EPDM rubber, includes an external portion 559 and an internal portion 561. External portion 559 includes a chamfered insertion end 563 that is first received in a port in the rim (not illustrated) during assembly. As check valve 526 is inserted into the rim port, an outwardly flared portion 565 of jacket 557 is compressed as it is pushed through the rim port. As flared portion 565 clears the rim port, jacket 557 expands to capture the rim between flared portion 565 and internal portion 561 of jacket 557. An upwardly tapered shoulder 567 of internal portion 561 is compressed against the relatively flat inner surface of the rim to ensure an adequate seal therebetween. A cylindrical tool 569 may be inserted into a void 571 created between body 532 and jacket 557 to facilitate insertion of check valve 526 into the rim.

Figure 10:
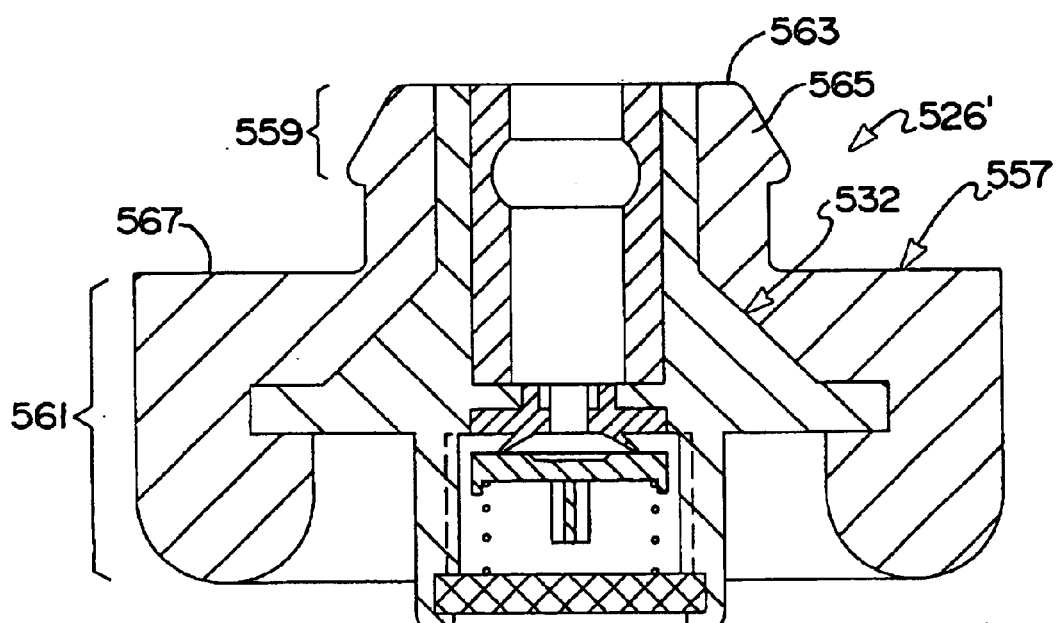
FIG. 10 is a cross-sectional view of a check valve according to another embodiment of the present invention.

Referring to FIG. 10, an alternate embodiment of check valve 526 is shown. In this embodiment, a check valve 526' is provided that is substantially similar to check valve 526 with at least one exception, namely, the shape of body 532 and jacket 557. In this embodiment, body 532 and jacket 557 are substantially shorter in axial dimension than the corresponding components in check valve 526. External portion 559 includes a chamfered insertion end 563 that is first received in the rim port during assembly and an outwardly flared portion 565 is compressed as it is pushed through the rim port. As flared portion 565 of jacket clears the rim port, jacket 557 expands to capture the rim between the flared portion 565 and internal portion 561 of jacket 557. A relatively flat shoulder 567 of internal portion 561 is compressed against the relatively flat inner surface of the rim to ensure an adequate seal therebetween. Unlike check valve 526 described above, check valve 526' does not accommodate the use of a tool to insert check valve 526' into the rim port.

Referring to FIG. 11, another embodiment of the present invention is shown in detail. In this embodiment, a check valve 626 is provided that includes a generally cylindrically-shaped body 632 that is made from a rigid material, such as metal or plastic. Body 632 includes inner and outer surfaces 652 and 654, respectively, and an internal opening 650. Internal opening 650 includes a valve member, such as the valve member 88 shown in FIGS. 2 and 11, or valve member 288 shown in FIG. 4.

Check valve 626 also includes a sealing jacket 657 that is attached to body 632. Sealing jacket 657, which is made from a flexible polymeric material, such as flourosilicone or EPDM rubber, includes an external portion 659 and an internal portion 661. External portion 659 includes an external end 663 that is first received in a port in the rim during assembly. As check valve 626 is further inserted into the rim port, a radially outward directed projection 665 is compressed as it is pushed through the rim port. When projection 665 clears the rim port, jacket 657 expands to capture the rim between projection 665 and internal portion 661 of jacket 657. A generally tapered shoulder 667 of internal portion 661 is compressed against the relatively flat inner surface of the rim to ensure an adequate seal therebetween.

Jacket 657 also includes a central longitudinal channel 642 that extends from external end 663 to body 632. An inner surface 647 of channel 642 is relatively smooth except for a recess 649 that accommodates a rib 662 on male connector 658. The inner diameter of channel 642 is slightly smaller than the outer diameter of male connector 658 to provide for sealing engagement upon assembly. Additionally, a plurality of ribs 669 adjacent external end 663 permit external segment 659 to be gripped and pulled through the rim port.

Referring to FIG. 12, another embodiment of the present invention is shown in detail. In this embodiment, a check valve 726 is provided that includes a generally cylindrically-shaped body 732 that is made from a rigid material, such as metal or plastic. Body 732 includes a central longitudinal channel 742 and inner and outer surfaces 744 and 746, respectively. Central longitudinal channel 742 extends from an external end 736 to a surface 747 defined by a radially inwardly directed shoulder 748. Body 732 also includes an internal opening 750 having an inner surface 752. Central longitudinal channel 742 is provided in communication with internal opening 750 via a duct 756. Internal opening 750 includes a valve member, such as the valve member 88 shown in FIGS. 2 and 12, or valve member 288 shown in FIG. 4.

Received within central longitudinal channel 742 is at least one annular sealing member 768. Inner surface 744 is relatively smooth except for a recess 749 that accommodates a rib 762 on male connector 758. Inner surface 744 is slightly larger than the outer diameter of male connector 758 to allow male connector 758 to be readily inserted into and removed from channel 742.

Check valve 726 also includes a sealing jacket 757 that is attached to body 732. Sealing jacket 757, which is made from a flexible polymeric material, such as flourosilicone or EPDM rubber, includes an external portion 759 and an internal portion 761. External portion 759 includes a ribbed outer surface 763 that is received in a port in rim 24 during assembly. A relatively flat shoulder 767 of internal portion 761 is compressed against the relatively flat inner surface of rim 24 to ensure an adequate seal therebetween. The compression of ribbed outer surface 763 within the rim port inhibits removal of check valve 726 from rim 24 and provides further sealing engagement between jacket 757 and rim 24.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A wheel valve assembly for adjusting the air pressure within a pneumatic tire of a vehicle comprising:

a body that extends from a first end in communication with a pressure source to a second end in communication with the tire;

a low pressure differential operable valve member received within the body between the first and second ends, the valve member moveable between open and closed positions for respectively allowing and preventing air communication between the pressure source and the tire; and a sealing member having a pressure energized lip against which the valve member is sealing engaged when the valve member is in the closed position.

2. The valve of claim 1, wherein centrifugal force generated as the tire rotates does not move the valve member from the closed position to the open position.

3. The valve of claim 1, wherein the valve member is biased into engagement with the sealing member by a resiliently compressible member.

4. The valve of claim 3, wherein the resiliently compressible member is a compression spring.

5. The valve of claim 1, wherein the valve member is retained within the body by a fluid permeable seat.

6. The valve of claim 1, wherein the body is configured to sealingly engage a male connector.

7. The valve of claim 6, wherein the body includes at least one sealing member to sealingly engage the male connector.

8. The valve of claim 1, further including a generally flexible grommet sealingly disposed between the body and the vehicle wheel.

9. The valve of claim 8, wherein the grommet includes a seal enhancing feature.

10. The valve of claim 9, wherein the seal enhancing feature is a groove having at least one pressure energized lip.

11. The valve of claim 10, wherein a pressure energized annular member is received within the groove to energize the lip.

12. The valve of claim 1, further including a flexible sealing jacket sealingly disposed between the body and the vehicle wheel.

13. The valve of claim 12, wherein the flexible sealing jacket includes at least one retaining member to secure the valve member to the vehicle wheel.

14. A wheel valve assembly for adjusting the air pressure within a pneumatic tire of a vehicle comprising:

a body that includes an external segment having an external end and an internal segment having an internal end, the external segment including a central longitudinal channel configured to sealingly secure the valve assembly to a mating connector, the internal segment configured for receipt within the tire;

a low pressure differential operable valve member received within the body, the valve member moveable between open and closed positions for respectively allowing and preventing air communication between the internal segment and the external segment of the body;

a sealing member having a pressure energized lip against which the valve member is sealingly engaged when the valve member is in the closed position; and a flexible sealing member sealingly disposed between the body and the vehicle wheel.

\* \* \* \* \*